(12) United States Patent
Meinhardt (10) Patent No.: US 11,617,419 B2
(45) Date of Patent: Apr. 4, 2023

(54) QUICK LACING SYSTEM AND SHOE EQUIPPED WITH SAME

(71) Applicant: Dee Luxe Sportartikel Handels GmbH, Kirchbichl/Tirol (AT)

(72) Inventor: Maximilian Meinhardt, Kufstein (AT)

(73) Assignee: Dee Luxe Sportartikel Handels GmbH, Kirchnic/Tirol (AT)

( * ) Notice: Subject to any disclaimer, the term of this patent is extended or adjusted under 35 U.S.C. 154(b) by 152 days.

(21) Appl. No.: 16/624,713

(22) PCT Filed: Jun. 19, 2018

(86) PCT No.: PCT/EP2018/066172
§ 371 (c)(1),
(2) Date: Dec. 19, 2019

(87) PCT Pub. No.: WO2018/234264
PCT Pub. Date: Dec. 27, 2018

(65) Prior Publication Data
US 2020/0214398 A1 Jul. 9, 2020

(30) Foreign Application Priority Data
Jun. 21, 2017 (DE) .......................... 102017113778.5

(51) Int. Cl.
*A43C 1/00* (2006.01)
*A43C 7/08* (2006.01)
(Continued)

(52) U.S. Cl.
CPC .......... *A43C 11/008* (2013.01); *A43B 5/0401* (2013.01); *A43C 1/003* (2013.01); *A43C 7/08* (2013.01)

(58) Field of Classification Search
CPC .. A43C 1/003; A43C 1/06; A43C 7/08; Y10T 24/3942; Y10T 24/3944; Y10T 24/3947; F16G 11/101; F16G 11/106
See application file for complete search history.

(56) References Cited

U.S. PATENT DOCUMENTS 583,646 A * 6/1897 George .................... A43C 7/04
24/712.6
4,071,926 A * 2/1978 Sweet .................... E06C 7/187
182/8
(Continued)

FOREIGN PATENT DOCUMENTS

CN 2183469 Y 11/1994
DE 891065 C 9/1953
(Continued)

OTHER PUBLICATIONS

Chinese Patent Office Action for Application No. 201880040926.X dated Mar. 3, 2021 (15 pages, English translation included).
(Continued)

*Primary Examiner* — Sharon M Prange
(74) *Attorney, Agent, or Firm* — Michael Best & Friedrich LLP (57) ABSTRACT

The invention relates to a quick lacing system (10) for releasably fixing at least one shoelace (20) to a housing (30), which has a channel (40) for feeding through at least one shoelace (20), wherein the channel (40) is at least partly made of a movably mounted rocker (50) with a substantially concave interior (60), which is oriented in the direction of the channel (40), on a first side and at least partly of an eccentric jaw (70), which interacts with the rocker (50) at least in a closed position of the quick lacing system (10), on a second side substantially opposite the rocker. The invention also relates to a shoe equipped with such a quick lacing system (10).

7 Claims, 5 Drawing Sheets

(51) Int. Cl.
*A43C 11/00* (2006.01)
*A43B 5/04* (2006.01)

(56) References Cited

U.S. PATENT DOCUMENTS

| | | | | |
|---|---|---|---|---|
| 4,355,441 | A | * 10/1982 | Hall | F16G 11/106 |
| | | | | 188/65.3 |
| 4,912,817 | A | 4/1990 | Sandreid | |
| 5,572,770 | A | 11/1996 | Boden | |
| 6,339,867 | B1 | 1/2002 | Azam | |
| 6,729,000 | B1 | * 5/2004 | Liu | A43C 3/04 |
| | | | | 24/132 WL |
| 6,902,031 | B2 | * 6/2005 | Ador | A62B 1/14 |
| | | | | 182/5 |
| 7,226,043 | B2 | * 6/2007 | Stone | B63B 21/08 |
| | | | | 254/391 |
| 7,401,423 | B2 | * 7/2008 | Reagan | A43C 1/06 |
| | | | | 36/50.1 |
| 8,474,157 | B2 | * 7/2013 | Motawi | A43B 3/0031 |
| | | | | 36/50.1 |
| 2001/0039696 | A1 | 11/2001 | Maciejczyk | |
| 2005/0005477 | A1 | 1/2005 | Borsoi | |
| 2006/0174460 | A1 | 8/2006 | Borsoi | |
| 2007/0000105 | A1 | 1/2007 | Grande et al. | |
| 2007/0215411 | A1 | 9/2007 | Petzl et al. | |
| 2008/0168685 | A1 | * 7/2008 | Kim | A43C 1/003 |
| | | | | 36/50.1 |
| 2011/0067211 | A1 | 3/2011 | Huber et al. | |
| 2013/0205622 | A1 | 8/2013 | Harald | |
| 2015/0313318 | A1 | * 11/2015 | Gibb | A43C 7/00 |
| | | | | 36/58.5 |

FOREIGN PATENT DOCUMENTS

| | | | |
|---|---|---|---|
| EP | 0012126 | A1 | 6/1980 |
| EP | 1495691 | A1 | 1/2005 |
| GB | 191504857 | A | 11/1915 |
| GB | 2481849 | A | 1/2012 |
| JP | H03127503 | U | 12/1991 |
| JP | 2013146560 | A | 8/2013 |

OTHER PUBLICATIONS

Chinese Patent Office Action for Application No. 201880040926.X dated Aug. 18, 2021 (10 pages, English translation included).
International Search Report and Written Opinion, PCT/US2018/066172, dated Aug. 9, 2018 (13 pages).
Search Report, German Application No. 102017113778.5, dated Feb. 12, 2018 (12 pages).
Japanese Patent Office Action for Application No. 2019-570436 dated Dec. 7, 2021 (5 pages, English translation included).
International Preliminary Report on Patentability, PCT/EP2018/066172, dated Jan. 2, 2020, 8 pages.
Chinese Office Action for Application No. 201880040926.X dated Jan. 20, 2022 (14 pages, with English translation).

* cited by examiner

Fig. 12

QUICK LACING SYSTEM AND SHOE EQUIPPED WITH SAME

CROSS REFERENCE TO RELATED APPLICATIONS

This application is a Section 371 national phase patent application of International Patent Application No. PCT/EP2018/066172, filed Jun. 19, 2018, which claims priority to German Patent Application No. 102017113778.5, filed Jun. 21, 2017, the entire contents of each of which are hereby incorporated by reference.

BACKGROUND

The invention relates to a quick lacing system and to a shoe equipped with such a quick lacing system.

Shoes that have shoelaces are still widely used compared to laceless shoes, such as so-called slip-ons for example, or also compared to shoes with a Velcro fastening. Usually, once the shoes have been pulled on, the shoelaces are secured by tying loops so as to prevent them from becoming undone. This is a cumbersome activity which first has to be learned and is not self-explanatory.

In order to circumvent the need to tie loops, a clamping device for shoelaces is described for example in DE 891 065, with the aid of which the shoelaces can be pulled as tight as desired and securely clamped. Said clamping device helps to prevent incorrect opening of the loops and an associated knot in the shoelaces when removing the shoes. The clamping device disclosed in DE 891 065 substantially consists of a housing which tapers in a wedge-shaped manner and a corresponding wedge, which presses the respective shoelace ends against the housing wall in a closed position of the clamping device and thereby arrests them by clamping.

In order to achieve an open position of the clamping device, that is to say a position in which the shoelaces inside the clamping device can be moved, the wedge must be manually brought into the open position. To avoid clamping the shoelaces in a closed position again, the wedge must continue to be manually kept in the open position, with the consequence that one hand of the user is required to keep the wedge in the open position for as long as the shoelace is to be moved. This is impractical since the user thus has only one free hand available for other tasks, such as tightening the shoelaces for example.

One improvement in this regard is described in U.S. Pat. No. 6,339,867 BI. Said document discloses a clamping device for shoelaces which can be locked in the open position. However, this clamping device has a complicated construction, and considerable force is required in order to move the clamping device from its open position to its closed position.

One feature that all these previously known clamping devices for shoelaces have in common is that they firstly require complex constructions and in addition are complicated and difficult to operate.

SUMMARY

The object of the invention is to solve these aforementioned disadvantages and to provide a lacing system, in particular a quick lacing system, and a shoe equipped with same, which can be operated in a simple and intuitive manner.

This object is achieved by a quick lacing system according to claim 1 and by a shoe according to claim 6.

In particular, this object is achieved by a quick lacing system for releasably securing at least one shoelace, comprising a housing which has a channel for feeding through at least one shoelace, wherein the channel is formed on a first side at least partly by a movably mounted rocker having a substantially concave inner side which is directed towards the channel and on a second side, substantially opposite the rocker, at least partly by an eccentric jaw which cooperates with the rocker at least in a closed position of the quick lacing system, wherein the rocker has a closing section and an opening section, and wherein the closing section during a closing operation is arranged in the direction of a direction of pulling exerted by a user and the opening section in the use position of the quick lacing system is arranged in the substantially opposite direction of the rocker, and wherein the closing section is urged away from the jaw into a holding position by a shoelace that is being tightened during the closing operation and the opening section moves closer to the jaw, and wherein the rocker can be arrested in the holding position, in particular by latching and/or snap-fastening.

The invention is also achieved by a quick lacing system for releasably securing at least one shoelace, comprising a housing which has a channel for feeding through at least one shoelace, wherein the channel is formed on a first side at least partly by a movably mounted rocker having a substantially concave inner side which is directed towards the channel and on a second side, substantially opposite the rocker, at least partly by an eccentric jaw which cooperates with the rocker at least in a closed position of the quick lacing system, wherein the rocker has a closing section and an opening section, and wherein the closing section during a closing operation is arranged in the direction of a direction of pulling exerted by a user and the opening section in the use position of the quick lacing system is arranged in the substantially opposite direction of the rocker, and wherein the closing section is urged away from the jaw into a holding position by a shoelace that is being tightened during the closing operation and the opening section moves closer to the jaw, and wherein the rocker can be arrested and/or blocked in the holding position, in particular by latching and/or snap-fastening and/or blocking.

One essential point of the invention is that the quick lacing system according to the invention comprises a housing in which a rocker is movably mounted, said rocker having a curvature, namely such that a concave inner side of the rocker is directed towards a channel formed in the housing. In addition, an eccentric jaw is arranged opposite the rocker, which jaw in turn at least partly forms a portion of the channel. In the use state of the quick lacing system according to the invention, at least one shoelace extends through the channel and between the concave inner side of the rocker and the eccentric jaw.

The rocker is configured in such a way that it bounds a portion of the channel and is mounted in the manner of a seesaw about a point of rotation. The rocker has a closing section and an opening section. The closing section and the opening section are arranged at opposite ends of the rocker, wherein the closing section is located at the end of the rocker that extends towards the hand of a user who is operating the quick lacing system and who is effecting a closing operation by pulling. Located opposite this is the opening section of the rocker, which extends towards the shoelace coming from a shoe.

One essential point of the invention is that the rocker is designed in the manner of a seesaw and has a concave inner side, wherein, in an open state of the quick lacing system, the closing section extends towards a side of the channel that is located opposite the rocker. In this open state, the opening section of the rocker is located at a distance from the jaw on the side of the channel that is located opposite the jaw.

When a closing operation or securing operation is triggered by a user, during which the user pulls on a free end of the shoelace, the shoelace tightens since it is guided and thus held on the shoe or in eyelets of a shoe at one end and at the other end a pulling force is being exerted by a user. By tightening the shoelace, the latter is tensioned and thus presses against the closing section of the rocker that narrows the channel of the rocker, and automatically urges said rocker away from the jaw into a holding position, in which the rocker is arrested, in particular by latching and/or snap-fastening. At the same time as the closing section of the rocker is moved towards the holding position, the opening section of the rocker moves towards the jaw, namely such that the opening section of the rocker shifts the shoelace such that the jaw, which preferably has a toothed surface, comes at least partly into contact with the shoelace and presses with the shoelace against the concave inner side of the opening section of the rocker and thereby secures the shoelace against slipping back again as soon as a pulling force exerted by a user to close or lace the shoe lessens on the shoelace. Due to the lessening of the pulling force during the closing operation, the shoelace slides back a little in the channel and blocks against the preferably toothed surface of the eccentric jaw, which is rotatably mounted, and in doing so moves the jaw towards the opening section of the rocker, so that the shoelace is clamped between the eccentric jaw and the concave inner side of the opening section of the rocker.

As mentioned above, in the closed position of the quick lacing system, the rocker is arrested in a holding position. This can be achieved by a latching or snap-fastening mechanism, in the case of which for example a recess or a hook, which is formed on the rocker, comes into contact or into engagement with an unlocking button or an unlocking lever.

At least in the holding position, said unlocking button or said unlocking lever is urged by the rocker, or a hook, pin or other contact point fitted on the rocker, into a position in which the unlocking button or an operating section of the unlocking lever protrudes out of the housing, so that a user can press on the unlocking button or on the operating section of the unlocking lever and in this way can release the arresting of the rocker.

It is provided according to the invention that the rocker, when the latter is urged by the shoelace into the holding position, automatically arrests and in turn automatically pushes the unlocking button or the operating section of the unlocking lever out of the housing, optionally counter to the action of a spring, in order to make it possible for the unlocking button or the operating section of the unlocking lever to be operated.

According to an alternative embodiment of the invention, the unlocking button or an operating section is enabled and is urged out of the housing by a spring force when the closing section of the rocker is urged away from the jaw during the closing operation or the opening section is urged towards the jaw during the closing operation, so that the unlocking button or the operating section becomes accessible to a user for a lacing release operation. According to this embodiment, the unlocking button or an operating section is kept in the housing in an open position of the quick lacing system by the opening section of the rocker, in particular counter to a spring force. When the shoelace is then tensioned during a closing operation and presses against the closing section of the rocker and thus urges the latter away from the jaw, the opening section of the rocker equally moves towards the jaw and thereby releases the unlocking button or the operating section, so that the unlocking button or the operating section is urged out of the housing, in particular with the assistance of a spring, that is to say by means of spring force, and in this way becomes accessible to a user for a lacing release operation.

During the closing operation, the opening section of the rocker comes out of engagement with a lower section of the unlocking button, which reciprocally also applies to the unlocking button, whereupon the opening section of the rocker is pushed towards the jaw by the tensioning of the shoelace and the lower section of the unlocking button comes into lateral contact with the opening section and secures this opening section against slipping back. To open the lacing again, the unlocking button is pressed down again counter to the upwardly urging spring force, namely until the opening section, when the tension on the shoelace is released, comes back into engagement with the lower part of the unlocking button and in this way arrests the unlocking button, so that the unlocking button cannot be moved upwards out of the housing in the unlaced state of the quick lacing system.

According to the invention, in an extremely advantageous manner, the lacing is released by releasing the arresting of the rocker from the holding position, so that the rocker is freely movable once the arresting has been released. As a result of this free mobility of the rocker, the latter is now pushed away from the jaw into the open position of the quick lacing system by the taut shoelace extending between the arresting of the shoelace between the concave inner section of the opening section and the jaw and the shoe, respectively the eyelets of the shoe, so that the clamping action exerted by the jaw against the concave inner side of the opening section is eliminated. In this state, the shoelace can be moved freely through the channel and the shoe can be opened.

One essential point of the invention is additionally that the shoelace can extend freely out of the housing of the quick lacing system both on the bottom side, that is to say directed towards the shoe, and on the top side, that is to say directed towards the hand of a user, and is not hindered by the housing. This ensures that the rocker can be both brought into the holding position and moved back out of the latter solely by the tensioning of the shoelace.

According to another embodiment of the invention, the jaw is configured as a double jaw, wherein the double jaw consists of two movable individual jaws, which according to a particularly preferred embodiment can be moved independently of one another. This embodiment has the significant advantage that one or two shoelaces are not arrested by one jaw against the concave inner side of the opening section of the rocker, but instead each shoelace separately. In addition, the invention also encompasses the possibility of dividing the jaw also into more than two individual jaws which are movable independently of one another. This latter embodiment may be useful if more than two shoelaces are to be secured. Moreover, configuring the jaw as a double jaw also has the significant advantage that a twisting of the shoelaces is impossible if the individual jaws of the double jaw are separated from one another by a separating wall.

In addition, the object according to the invention is also achieved by a shoe according to claim 6, which is equipped with at least one quick lacing system as discussed above.

According to one particularly preferred embodiment, the quick lacing system is arranged at a top end of a shoe upper, in particular between an inner shoe or an inner shell and an outer shoe or an outer shell, preferably in a recess which is provided for the quick lacing system.

In addition, the shoe according to the invention advantageously has a quick lacing system on each side of the shoe upper.

In summary, the essential points of the invention can thus be stated as follows:

According to one preferred embodiment of the invention, the clamping device for quick lacing systems on snowboard boots consists of five parts. According to the invention, a holder for the quick lacing system according to the invention sits flush with the top edge of the upper at the position known from the previous FLD, but is securely sewn between the outer material and the lining material. The quick lacing system in a state installed in a shoe upper is thus visible only when viewed from above.

During manufacture of the shoe, a housing, once the other components have been inserted, namely the rocker, the jaw and the unlocking button or the unlocking lever and once the shoelace has been threaded in, is pushed into the holder from above and latches into the correct position. To this end, positioning latches are provided in the holder. The housing then ends flush with the top edge. If it is desired to replace the quick lacing system, the quick lacing system can advantageously be removed from the holder and replaced.

The interior of the housing contains a push button, which can be clearly seen and reached from outside only in the locked state, a rocker, and an eccentric jaw which is provided with teeth for better holding of the shoelace.

The shoelaces extend between the jaw and the rocker. When the shoelaces are pulled in order to close the shoe, the upper part of the rocker is thus pushed towards the push button, where it is mechanically locked. The lower part of the rocker is thus brought so close to the jaw that both components exert pressure on the shoelaces. Due to the eccentric shape of the jaw, further pulling on the shoelaces is possible, but if these are released they are automatically clamped.

To unlock the clamping device, the push button is pushed back into the housing in order to release the rocker. Since the shoelaces before this are highly tensioned, these push the lower part of the rocker so far to the side that they can run freely through the clamping device again.

The construction enables the use either of one or two shoelaces customary for quick lacing systems or alternatively of a conventional shoelace.

Instead of the single jaw, there is also the possibility of a double jaw, which clamps two shoelaces independently of one another. The double jaw consists of two individual, narrower jaws which are connected via an integrated axle. A separating wall, which is necessary only on one of the two narrower jaws, prevents the crossover of the shoelaces. However, this possibility is only applicable when using two shoelaces customary for quick lacing systems.

The advantages of the invention can be summarized as follows:

The interaction with the clamping device is reduced to a minimum. When lacing the shoe, all that is required is to pull on the shoelaces; the lock works automatically. To open the shoe, all that is required is to push one button and the shoelaces are released. This principle makes the clamping device easier and more intuitive to understand and the shoe is laced very quickly.

The eccentric jaw can be rotated so far that there is no longer any gap between it and the rocker. Besides promising extremely strong clamping, this also means that a worn shoelace which has become thinner for example is still held just as securely as if it were new. Last but not least, this enables the use of shoelaces of different thickness, as a result of which new types of lacing sequences can be achieved. By way of example, a quick lacing system using conventional shoelaces would be conceivable without requiring a different clamping device. Even the use of one or two thin shoelaces is possible without significant adaptation. With regard to an entire range of snowboard boots, mould costs can thus be reduced while a greater number of different boot designs is possible.

Further embodiments of the invention will become apparent from the dependent claims.

BRIEF DESCRIPTION OF THE DRAWINGS

The invention will be described below on the basis of exemplary embodiments, which will be explained in greater detail with reference to the figures, in which.

DETAILED DESCRIPTION

Figure 1:
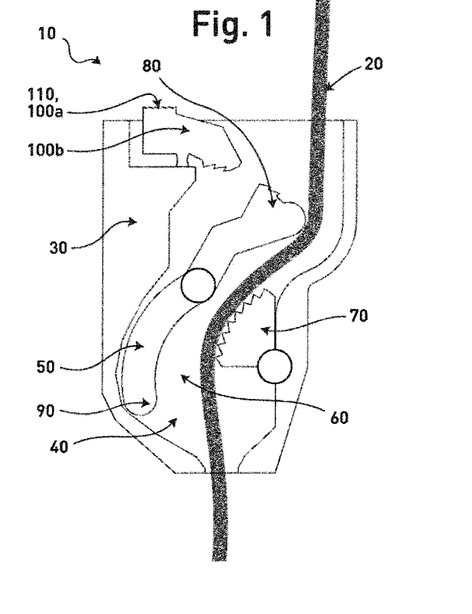
FIG. 1 shows a schematic illustration of a first embodiment according to the invention with a quick lacing system in the open position.

FIG. 1 shows a schematic illustration of a quick lacing system 10 according to the invention. The quick lacing system 10 comprises a channel 40 which extends through a housing 30. A shoelace 20 extends through the channel 40. As shown in FIG. 1, the channel 40 is bounded on the left-hand side partly by a rocker 50, and on the right-hand side partly by a jaw 70. The rocker 50 has a closing section 80, which in FIG. 1 extends towards the upper end of the quick lacing system 10, from which pulling takes place in order to close or lace the quick lacing system 10 when a user carries out a closing operation. Located at the opposite end of the rocker 50 is an opening section 90, the concave inner side 60 of which cooperates with the jaw 70 in order to clamp the shoelace 20 in a closed position.

As can be seen from FIG. 1, the closing section 80 of the rocker 50 extends towards the side of the channel 40 that is located opposite the rocker. When the shoelace 20 is pulled upwards in order to trigger a shoelace securing operation, the shoelace 20 tightens and presses against the closing section 80 of the rocker 50 and moves it towards a holding position, in which the rocker 50 comes into engagement with an unlocking lever 100b. At the same time as the closing section 80 is moved towards the holding position, the opening section 90 moves with its concave inner side 60 towards the toothed jaw 70, so that the shoelace 20 comes into contact with the toothing of the jaw 70. Since the rocker 50 is arrested in the holding position, the opening section 90 of the rocker 50, even when an opposing pressure is applied by the shoelace 20 and the jaw 70, cannot move when the shoelace 20 is relieved of tension and is pressed together with the eccentric jaw 70 against the concave inner side 60 of the opening section 90 of the rocker 50, so that the shoelace is clamped between the jaw 70 and the concave inner side 60 of the opening section 90 of the rocker 50.

To open the quick lacing system 10, the operating section 110 of the unlocking lever 100b, or the unlocking button 100a, is actuated by pressing, so that the rocker 50 can be moved from its holding position to its open position. This movement takes place automatically due to the tensioning of the shoelace 20, wherein the opening section 90 is pushed to the left and away from the jaw 70 by the shoelace 20, or by the tensioning of the shoelace 20.

Figure 2:
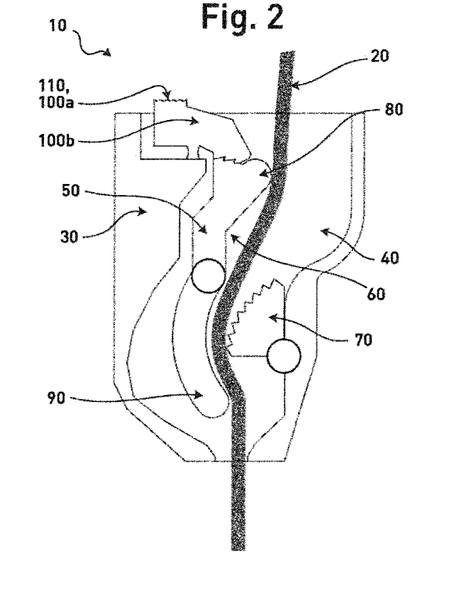
FIG. 2 shows a schematic illustration of the embodiment of the invention shown in FIG. 1, in the half-closed position.
Figure 3:
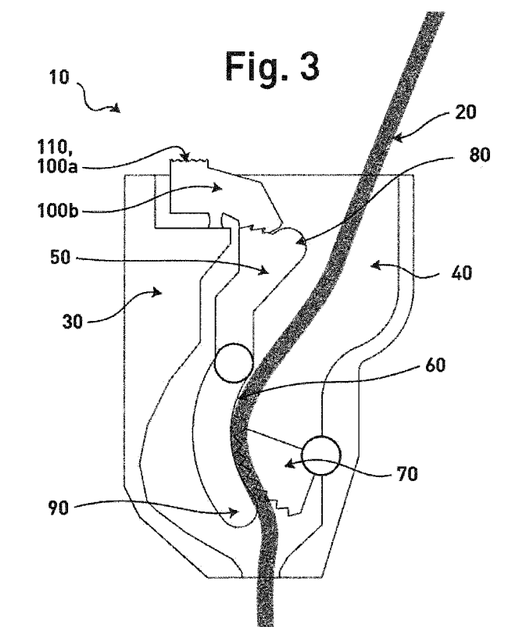
FIG. 3 shows a schematic illustration of the embodiment of the invention shown in FIG. 1, in the closed position.

FIG. 4 to FIG. 9 schematically show further embodiments of the invention, the clamping and opening mechanism of which is identical to that in FIG. 1 to FIG. 3.

Figure 4:
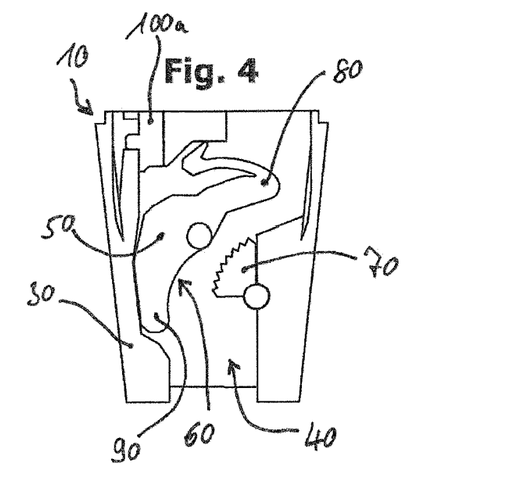
FIG. 4 shows a schematic illustration of another embodiment according to the invention with a quick lacing system in the open position.
Figure 5:
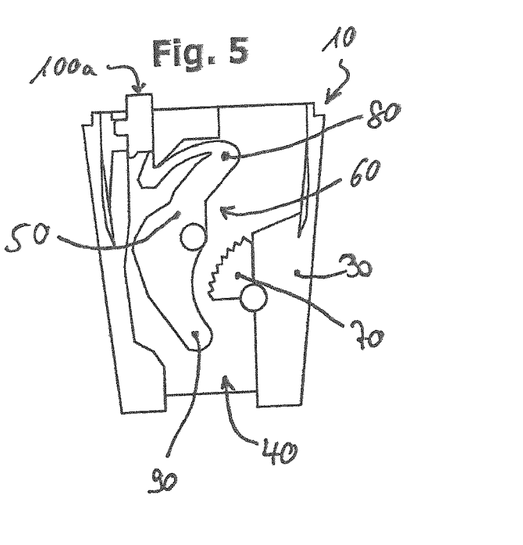
FIG. 5 shows a schematic illustration of the embodiment of the invention shown in FIG. 4, in the half-closed position.
Figure 6:
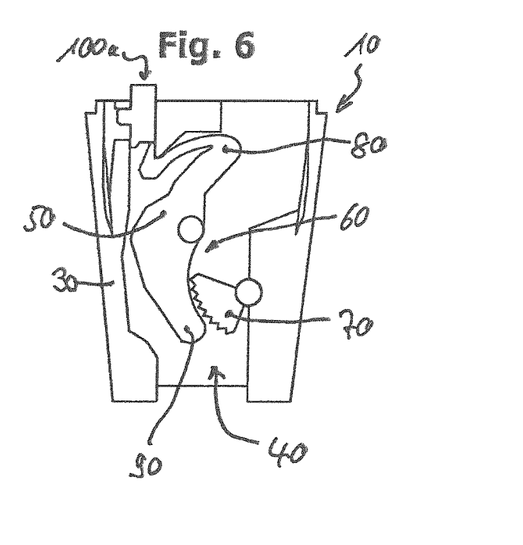
FIG. 6 shows a schematic illustration of the embodiment of the invention shown in FIG. 4, in the closed position.
Figure 7:
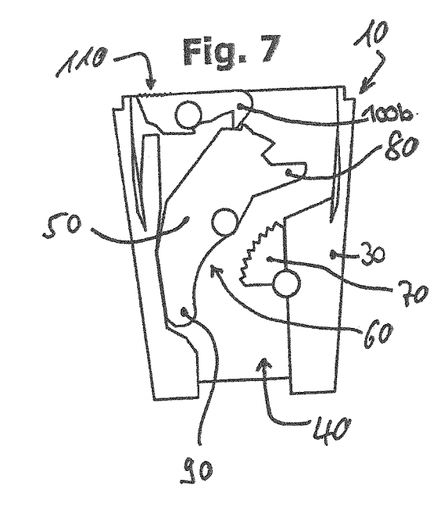
FIG. 7 shows a schematic illustration of another embodiment according to the invention with a quick lacing system in the open position.
Figure 8:
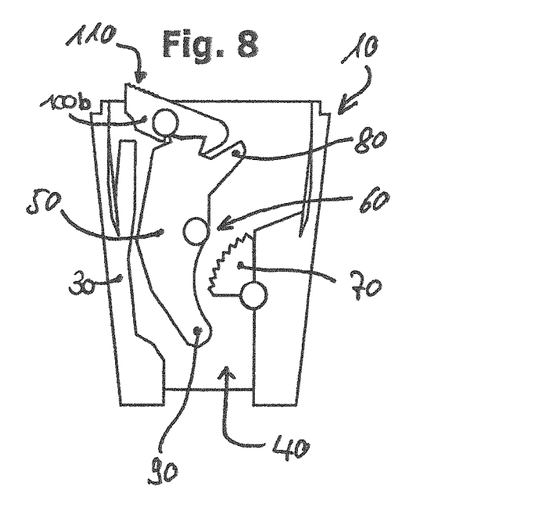
FIG. 8 shows a schematic illustration of the embodiment of the invention shown in FIG. 7, in the half-closed position.
Figure 9:
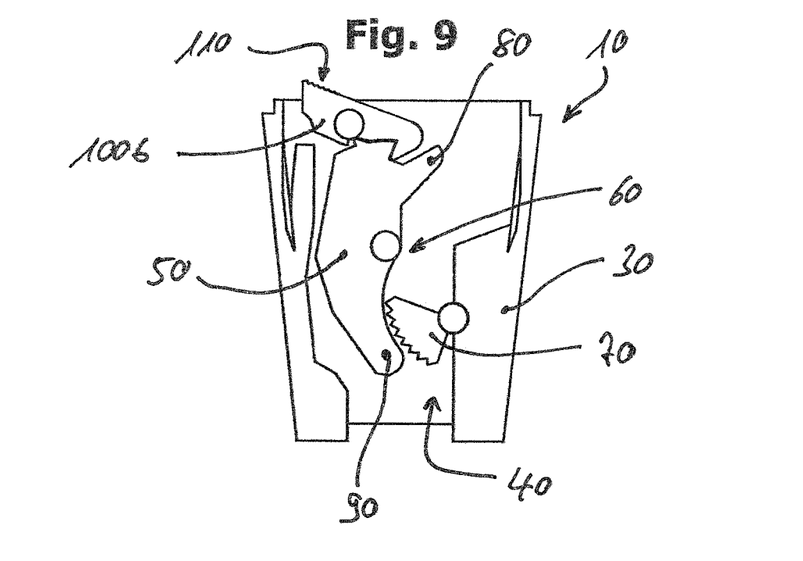
FIG. 9 shows a schematic illustration of the embodiment of the invention shown in FIG. 7, in the closed position.

In contrast to the embodiments shown in FIG. 1 to FIG. 3, however, in the embodiments shown in FIG. 4 to FIG. 9 an operating section 110 or an unlocking button 100a is visible only when the quick lacing system 10 according to the invention is in the closed position. In this state, as shown in FIG. 4 to FIG. 6, an unlocking button 100a is pushed upwards by a hook formed on the rocker 50, so that said unlocking button protrudes out of the housing 30 of the quick lacing system 10 and can be pressed by a user in order to open the quick lacing system 10. In FIG. 7 to FIG. 8, it is not an unlocking button but rather an unlocking lever 100b, the operating section 110 of which protrudes upwards out of the housing 30 of the quick lacing system 10 in the closed position of the quick lacing system 10 and can be operated in the same way to open the quick lacing system 10.

Figure 10:
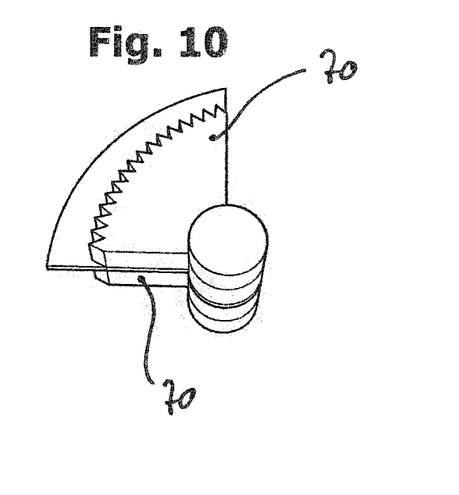
FIG. 10 shows a schematic illustration of a double jaw according to the invention with jaws moving synchronously.
Figure 11:
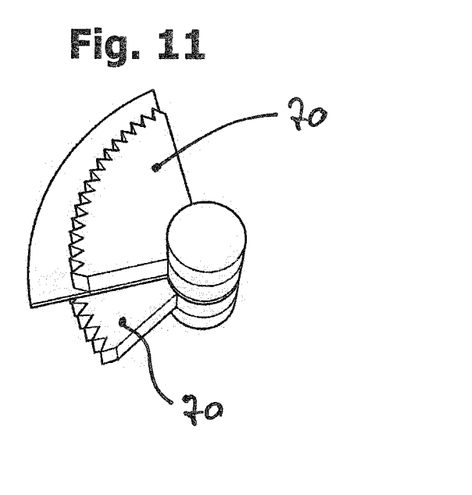
FIG. 11 shows a schematic illustration of a double jaw according to the invention with jaws moving asynchronously.

FIG. 10 and FIG. 11 show a double-jaw system comprising two separate individual jaws 70 which are movable relative to one another and which can be used as an alternative to a single jaw 70 in the quick lacing system 10 according to the invention.

Figure 12:
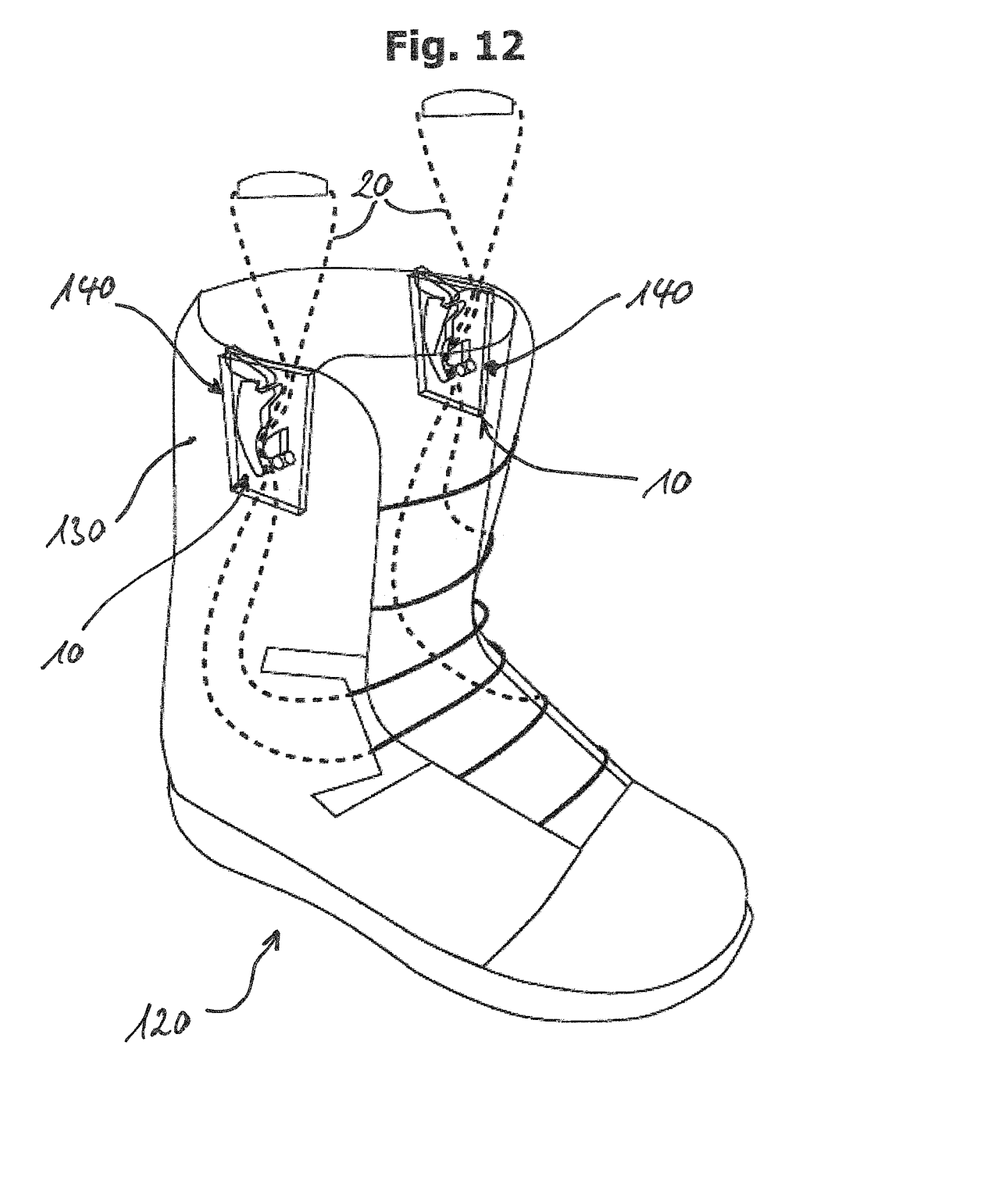
FIG. 12 shows a schematic illustration of a shoe according to the invention, which is equipped with two quick lacing systems according to the invention.

FIG. 12 shows a shoe 120 according to the invention, wherein a respective quick lacing system 10 according to the invention is arranged in a recess 140 on each side of the shoe upper 130 thereof.

Figures 13, 14:
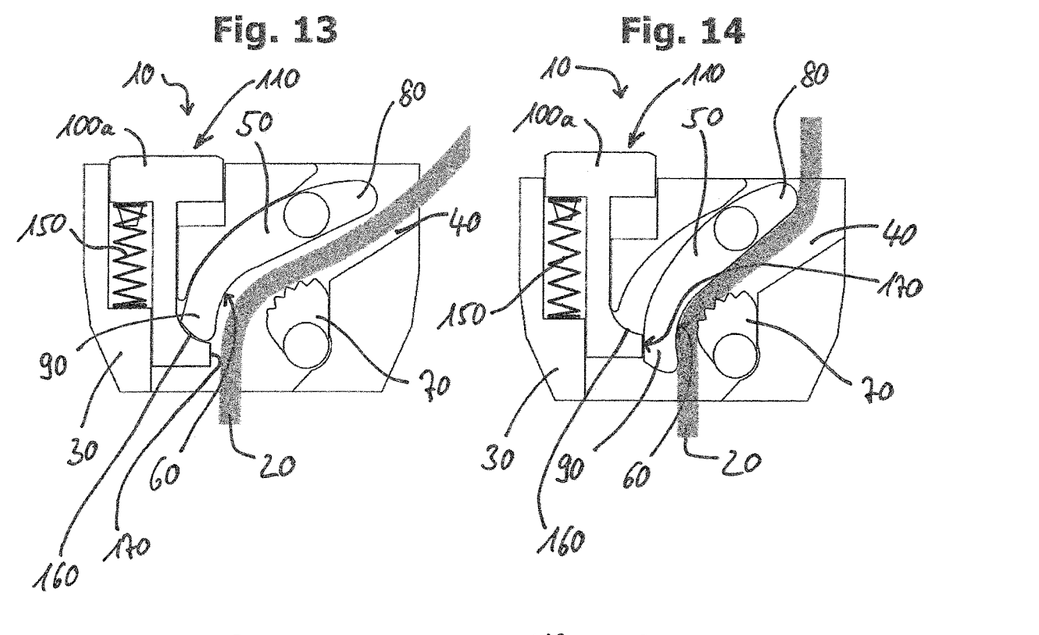
FIG. 13 shows a schematic illustration of a second embodiment according to the invention with a quick lacing system in the open position.
FIG. 14 shows a schematic illustration of the embodiment of the invention shown in FIG. 13, in the half-closed position.

FIG. 13 shows a schematic illustration of a second embodiment according to the invention with a quick lacing system 10 in the open position, in which a shoelace 20 is guided through a channel 40 which is arranged in a housing 30 and which, as shown in FIG. 13, is bounded on the left-hand side by a rocker 50 having a closing section 80 and an opening section 90 and on the right-hand side by a jaw 70. As shown in FIG. 13, the opening section 90 is in engagement with an engagement section 160 and thus arrests the unlocking button 100a, counter to the pressure of a spring 150, in a position in which the unlocking button 100a is substantially retracted into the housing 30 of the quick lacing system 10.

To close the quick lacing system 10 according to the invention, the shoelace 20 is pulled upwards as shown schematically in FIG. 14, wherein the shoelace 20 comes into contact with the closing section 80 of the rocker 50 and urges the closing section 80 away from the jaw 70, or moves said closing section 80 towards the unlocking button 100a, wherein the opening section 90 is moved out of engagement with the engagement section 160 and towards the jaw 70, and wherein the unlocking button 100a is urged upwards out of the housing 30 due to the spring force of the spring 150. By virtue of this upward linear movement, the blocking section 170 of the unlocking button 100a slides along the outer side of the opening section 90, opposite the inner side 60, and in this way prevents the opening section 90 of the rocker 50 from moving while the shoelace 20 is clamped between the inner side 60 of the rocker 50 and the jaw. In this state, the quick lacing system 10 according to the invention is in a half-closed position, since the jaw, in the course of closing the quick lacing system 10 with the shoelace 20, is not yet in compression contact with the inner side 60 of the rocker.

Figures 15, 16:
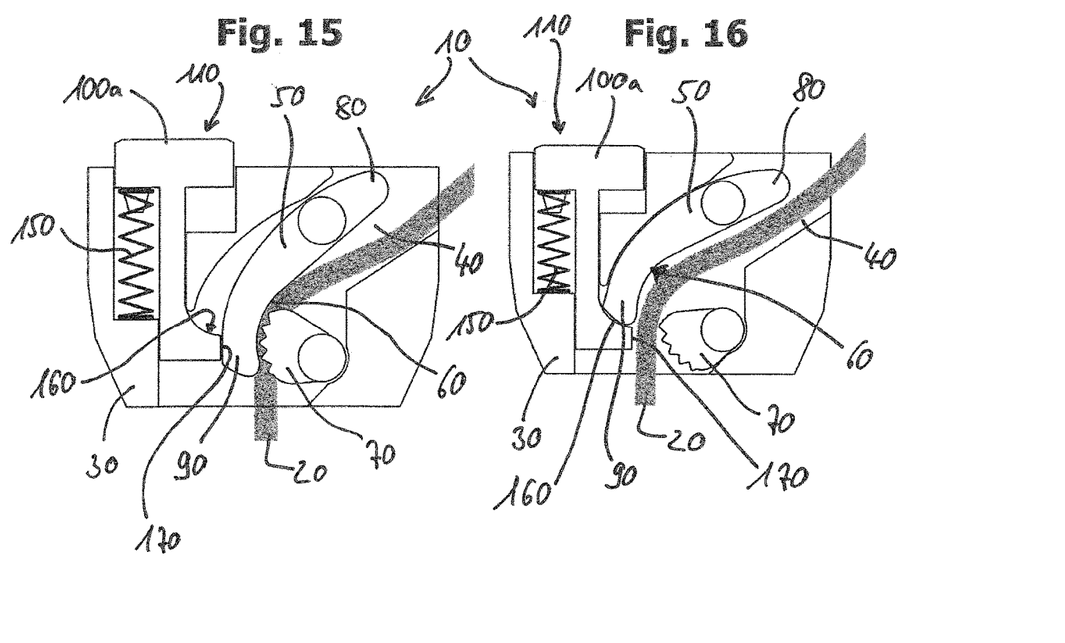
FIG. 15 shows a schematic illustration of the embodiment of the invention shown in FIG. 13, in the closed position.
FIG. 16 shows a schematic illustration of the embodiment of the invention shown in FIG. 13, in the open position.

FIG. 15 shows a schematic illustration of the embodiment of the invention shown in FIG. 13, in the closed position, wherein, by releasing the upper part of the shoelace 20 and the tension built up in the lower part of the shoelace 20, the jaw 70 now slips into compression contact with the inner side 60 of the rocker 50 in the opening section 90 thereof and reliably clamps the shoelace and secures it against inadvertent opening, while the blocking section 170 secures the opening section 90 of the rocker 50 in its closed position. In this closed position, the unlocking button 100a is in a state moved out of the housing 30.

FIG. 16 shows a schematic illustration of the embodiment of the invention shown in FIG. 13, in the open position, wherein, in order to open the quick lacing system 10 according to the invention, pressure has been exerted on the unlocking button 100a so that the blocking section 170 slips below the opening section 90 of the rocker 50 and thereby releases the opening section 90, as a result of which the shoelace 20 is likewise released from being clamped between the inner side 60 and the jaw 70 and can slide downwards out of the housing 30 through the channel 40. In the course of re-closing the quick lacing system according to the invention, the shoelace 20 then bears against the toothed jaw 70 and entrains the jaw 70, which is mounted about a rotatable axle, towards the closing section 80 of the rocker 50, so that the shoelace 20, when pulled again by a user, once again comes into contact with the closing section 80 and urges the latter to the side, as described above, so that once again the inner side 60 of the rocker 50 comes into contact with the shoelace 20 and once again urges the latter against the toothed surface of the jaw 70.

At this point, it should be pointed out that all the parts described above are claimed as essential to the invention both alone and in any combination, particularly the details shown in the drawings. Modifications thereto will be familiar to a person skilled in the art.

The invention claimed is:

1. Quick lacing system (10) for releasably securing at least one shoelace (20), comprising a housing (30) which has a channel (40) for feeding through at least one shoelace (20), characterized in that the channel (40) is formed on a first side at least partly by a movably mounted rocker (50) having a substantially concave inner side (60) which is directed towards the channel (40) and on a second side, substantially opposite the rocker, at least partly by an eccentric jaw (70) which cooperates with the rocker (50) at least in a closed position of the quick lacing system (10), wherein the rocker (50) has a closing section (80) and an opening section (90), and wherein the closing section (80) during a closing operation is arranged in the direction of a direction of pulling exerted by a user and the opening section (90) in a use position of the quick lacing system (10) is arranged in the substantially opposite direction of the closing section (80), and wherein the closing section (80) is moved into a holding position away from the jaw (70) via pulling the shoelace (20) for tightening during the closing operation and the opening section (90) moves toward the jaw (70), at which point the rocker (50) is held in the holding position,
wherein at least in the holding position, the rocker (50) is in engagement with an unlocking button (100a) or an unlocking lever (100b),
wherein the unlocking button (100a) or an operating section (110) is enabled and is urged out of the housing (30) by a spring force when the closing section (80) of the rocker (50) is urged away from the jaw (70) during the closing operation, so that the unlocking button (100a) or the operating section (110) becomes accessible to a user for a lacing release operation.

2. Quick lacing system according to claim 1, characterized in that, at least in the holding position, the unlocking button (100a) or the operating section (110) of the unlocking lever (100b) is urged out of the housing (30) by the rocker (50), so that the unlocking button (100a) or the operating section (110) of the unlocking lever (100b) becomes accessible to a user for a lacing release operation.

3. Quick lacing system according to claim 1, characterized in that the jaw (70) is configured as a double jaw comprising two individual jaws which are movable.

4. Quick lacing system according to claim 1, wherein the rocker (50) is held in the holding position by latching and/or snap-fastening.

5. Quick lacing system according to claim 1, characterized in that, at least in the holding position, the rocker (50) is in contact with the unlocking button (100a) or the unlocking lever (100b).

6. Quick lacing system (10) for releasably securing at least one shoelace (20), comprising a housing (30) which has a channel (40) for feeding through at least one shoelace (20), characterized in that the channel (40) is formed on a first side at least partly by a movably mounted rocker (50) having a substantially concave inner side (60) which is directed towards the channel (40) and on a second side, substantially opposite the rocker, at least partly by an eccentric jaw (70) which cooperates with the rocker (50) at least in a closed position of the quick lacing system (10), wherein the rocker (50) has a closing section (80) and an opening section (90), and wherein the closing section (80) during a closing operation is arranged in the direction of a direction of pulling exerted by a user and the opening section (90) in a use position of the quick lacing system (10) is arranged in the substantially opposite direction of the closing section (80), and wherein the closing section (80) is moved into a holding position away from the jaw (70) via pulling the shoelace (20) for tightening during the closing operation and the opening section (90) moves toward the jaw (70), at which point the rocker (50) is held in the holding position,
wherein at least in the holding position, the rocker (50) is in engagement with an unlocking button (100a) or an unlocking lever (100b),
wherein the opening section (90) is urged towards the jaw (70) during the closing operation, so that the unlocking button (100a) or an operating section (110) becomes accessible to a user for a lacing release operation,
wherein the jaw (70) is configured as a double jaw comprising two individual jaws which are movable independently of one another.

7. Quick lacing system (10) for releasably securing at least one shoelace (20), comprising a housing (30) which has a channel (40) for feeding through at least one shoelace (20), characterized in that the channel (40) is formed on a first side at least partly by a movably mounted rocker (50) having a substantially concave inner side (60) which is directed towards the channel (40) and on a second side, substantially opposite the rocker, at least partly by an eccentric jaw (70) which cooperates with the rocker (50) at least in a closed position of the quick lacing system (10), wherein the rocker (50) has a closing section (80) and an opening section (90), and wherein the closing section (80) during a closing operation is arranged in the direction of a direction of pulling exerted by a user and the opening section (90) in a use position of the quick lacing system (10) is arranged in the substantially opposite direction of the closing section (80), and wherein the closing section (80) is moved into a holding position away from the jaw (70) via pulling the shoelace (20) for tightening during the closing operation and the opening section (90) moves toward the jaw (70), at which point the rocker (50) is held in the holding position,
wherein at least in the holding position, the rocker (50) is in engagement with an unlocking button (100a) or an unlocking lever (100b),
wherein at least in the holding position, the unlocking button (100a) or an operating section (110) of the unlocking lever (100b) is urged out of the housing (30) by the rocker (50) counter to the action of a spring, so that the unlocking button (100a) or the operating section (110) of the unlocking lever (100b) becomes accessible to a user for a lacing release operation.

* * * * *